C. H. PIXLEY.
DEVICE FOR MEASURING SPECTACLE BRIDGES.
APPLICATION FILED JULY 26, 1913.
1,092,288.
Patented Apr. 7, 1914.
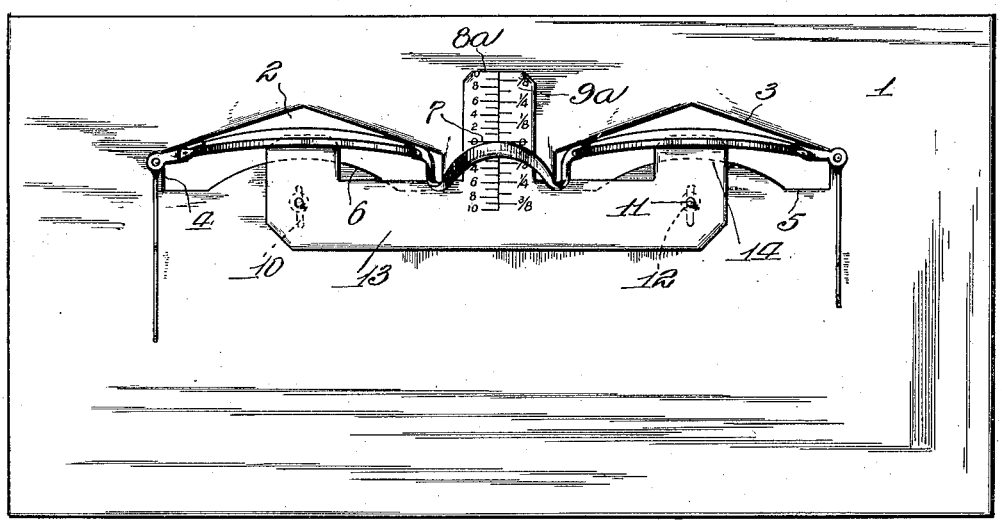
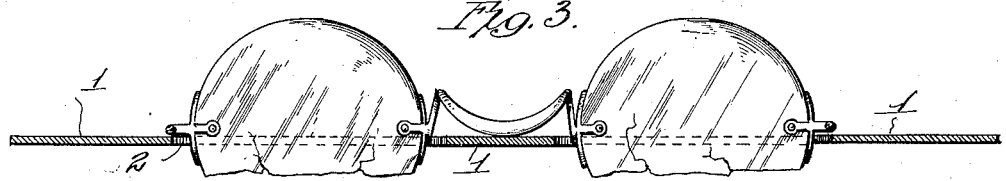
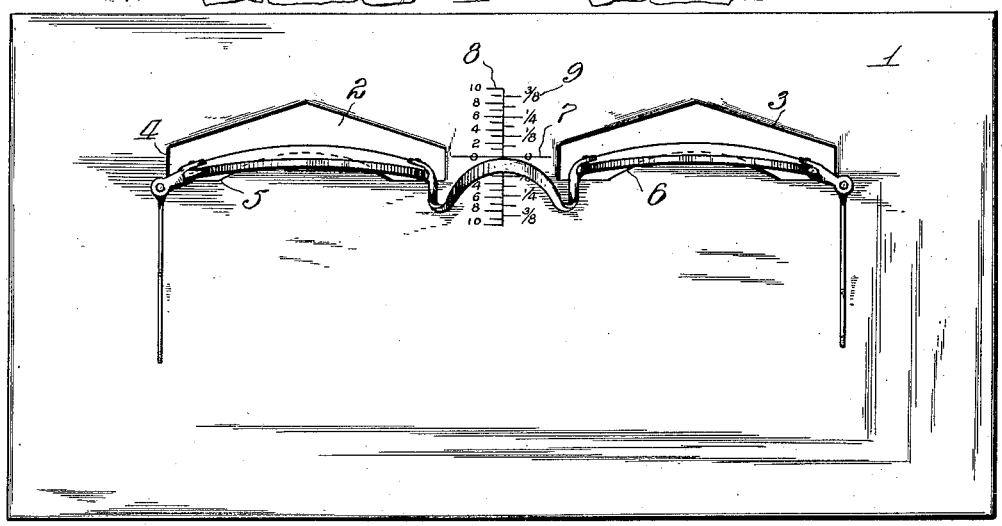
WITNESSES:
INVENTOR:
CHARLES HENRY PIXLEY.
ATTORNEY.

UNITED STATES PATENT OFFICE.

CHARLES HENRY PIXLEY, OF CHICAGO, ILLINOIS, ASSIGNOR TO F. A. HARDY & COMPANY, A CORPORATION OF ILLINOIS.

DEVICE FOR MEASURING SPECTACLE-BRIDGES.

1,092,288.  Specification of Letters Patent.  Patented Apr. 7, 1914.

Application filed July 26, 1913. Serial No. 781,294.

*To all whom it may concern:*

Be it known that I, CHARLES HENRY PIXLEY, a citizen of the United States, and a resident of Chicago, in the county of Cook and State of Illinois, have invented certain new and useful Improvements in Devices for Measuring Spectacle-Bridges, of which the following is a specification.

My present invention relates to devices for measuring the proper disposition of spectacle bridges with relation to the position of the lenses, and especially the position for the crown or top of the bridge. The condition to be secured by the location of the crown of the bridge is the positioning of the lenses so that they will not be engaged or contacted by the eye lashes as they are swept up and down by the motions of the eyelids. It is, therefore, necessary to ascertain with as much accuracy as possible the proper distance for locating the crown of the bridge in front or behind the rear surfaces of the lenses. With old style lenses, where the rear surfaces were comparatively flat planes, the location of the crown of the bridge was not so difficult, but with the present style of deep periscopic lenses, the rear surfaces of which are dished or curved, it is not an easy matter to measure the proper location of the arch of the bridge with respect to these curved rear surfaces. My device for measuring this location of the crown of the bridge, which is applicable both to the old style substantially plano glass and the present periscopic lenses, is illustrated in the accompanying drawing in which:—

Figure 1 illustrates the device provided with a movable gage, a pair of spectacles being shown in position for the measurement of the bridge therewith; and Fig. 2 is an illustration of the device without a movable gage, a pair of spectacles being shown in position for the measurement of the bridge therewith. Fig. 3 is a horizontal section of the structure shown in Fig. 2, the spectacles being shown in full lines. The movable form being preferred by some operators and probably being handier with lenses of an especially deep curvature.

Similar reference characters refer to similar parts throughout the several views.

The device consists substantially of a blank or templet, 1, of suitable material, such as cardboard of a good quality, celluloid, ivory, or a suitable light metal, in which are provided apertures, 2, disposed to receive the lenses of a pair of spectacles. The forward or anterior edges of the apertures, 2, are preferably of angular contour having the sides 3, as shown. From the outer terminations of the front edges the apertures have the sides 4 running directly rearwardly. From the posterior ends of the sides 4, the apertures are brought toward their centers respectively, in a horizontal direction, as shown at 5, and, between the ends of the portions 5 in the posterior edges of the apertures, are provided the forwardly or anteriorly extending curved segments 6. At the center of, and at right angles to, a line, 7, joining the forward edges of the segments 6, are disposed millimeter and inch scales, designated respectively by numerals 8 and 9, extending both anteriorly and posteriorly from the line, 7, as a zero point.

The form of measuring device above described is illustrated in Fig. 2.

The form of device illustrated in Fig. 1 is the same as that illustrated in Fig. 2, except that, in addition thereto, slots 10 are provided in the templet, 1, through which by means of pins, 11, and washers, 12, is slidably mounted the T-shaped member 13, the ends of the arms 14 whereof are adapted to be pressed against the rear surfaces of the lenses, and upon the central member of said T are provided the millimeter and inch scales $8^a$ and $9^a$, similar in all respects to the scales 8 and 9.

The device is operated by placing the upper segments of the spectacles in the apertures 2, with the temples extending posteriorly, and, either drawing the spectacles posteriorly until the lenses contact with the segments 6, or pressing the T-shaped member 13 anteriorly until the ends 14 contact with the rear faces of the lenses, when the crown of the bridge will rest upon the scales 8 and 9, or $8^a$ and $9^a$, and its location can immediately be read therefrom.

Having thus described my invention, what I claim as new and desire to secure by Letters Patent is:—

1. A templet having provided therein apertures for the reception of deeply curved lenses of a spectacle, with portions of said apertures designed to contact the rear surfaces of said lenses and scales disposed at the center of a line joining the lens contacting portion of said apertures adapted to indicate the posterior or anterior location of the crown of the bridge of said spectacle with respect to said line and to the rear surface of said lenses.

2. A templet having provided therein apertures for the reception of deeply curved lenses of a spectacle, and a T-shaped member slidably mounted upon said templet the outer ends of said T being adapted to contact the inner surfaces of lenses located in said apertures, and the central portion of said T being provided with scales for showing the posterior or anterior location of the crown of the bridge of the spectacle with reference to a line joining the lens contacting portions thereof.

In testimony whereof I affix my signature in the presence of two witnesses.

CHARLES HENRY PIXLEY.

Witnesses:
JOHN H. HARDIN,
BENJ. T. ROODHOUSE.

Copies of this patent may be obtained for five cents each, by addressing the "Commissioner of Patents, Washington, D. C."